US011845694B2

(12) United States Patent
Nishikawa et al.

(10) Patent No.: US 11,845,694 B2
(45) Date of Patent: Dec. 19, 2023

(54) COMPOSITION FOR FORMING CASTING MOLD AND CASTING MOLD FORMING METHOD

(71) Applicant: SINTOKOGIO, LTD., Nagoya (JP)

(72) Inventors: Kazuyuki Nishikawa, Toyokawa (JP); Masanori Tomioka, Toyokawa (JP); Yusuke Kato, Toyokawa (JP); Tetsuji Matsui, Toyokawa (JP); Tomohiro Aoki, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 90 days.

(21) Appl. No.: 17/602,330

(22) PCT Filed: Mar. 4, 2020

(86) PCT No.: PCT/JP2020/009243
§ 371 (c)(1),
(2) Date: Oct. 8, 2021

(87) PCT Pub. No.: WO2021/019816
PCT Pub. Date: Feb. 4, 2021

(65) Prior Publication Data
US 2022/0194855 A1 Jun. 23, 2022

(30) Foreign Application Priority Data
Jul. 26, 2019 (JP) .................................. 2019-137906

(51) Int. Cl.
| | | |
|---|---|---|
| C04B 28/00 | (2006.01) | |
| B22C 1/10 | (2006.01) | |
| B22C 1/18 | (2006.01) | |
| C04B 14/02 | (2006.01) | |
| C04B 14/06 | (2006.01) | |
| C04B 22/02 | (2006.01) | |
| C04B 22/04 | (2006.01) | |
| C04B 103/40 | (2006.01) | |
| C04B 111/28 | (2006.01) | |

(52) U.S. Cl.
CPC .............. *C04B 28/006* (2013.01); *B22C 1/10* (2013.01); *B22C 1/188* (2013.01); *C04B 14/022* (2013.01); *C04B 14/06* (2013.01); *C04B 22/02* (2013.01); *C04B 22/04* (2013.01); *C04B 2103/402* (2013.01); *C04B 2103/406* (2013.01); *C04B 2111/28* (2013.01)

(58) Field of Classification Search
CPC ..... C04B 28/006; C04B 14/022; C04B 14/06; C04B 22/02; C04B 22/04; C04B 2103/402; C04B 2103/406; C04B 2111/28; C04B 2111/00939; C04B 28/26; B22C 1/10; B22C 1/188; B22C 1/00; B22C 1/18
See application file for complete search history.

(56) References Cited

U.S. PATENT DOCUMENTS

| | | | |
|---|---|---|---|
| 3,218,683 | A | 11/1965 | Takio et al. |
| 3,287,213 | A | 11/1966 | Augus |
| 3,474,851 | A | 10/1969 | Ronald |
| 2010/0326620 | A1 | 12/2010 | Müller et al. |
| 2014/0284015 | A1 | 9/2014 | Mitsutake et al. |
| 2017/0050236 | A1 | 2/2017 | Tanaka |

FOREIGN PATENT DOCUMENTS

| | | | |
|---|---|---|---|
| CN | 1143549 | A | 2/1997 |
| CN | 1758968 | A | 4/2006 |
| CN | 101842175 | A | 9/2010 |
| CN | 103974789 | A | 8/2014 |
| CN | 105108040 | A | 12/2015 |
| CN | 106660109 | A | 5/2017 |
| DE | 1 508 634 | A1 | 10/1969 |
| FR | 1357239 | A | 4/1964 |
| GB | 1016473 | A | 1/1966 |
| GB | 1079200 | A | 8/1967 |
| GB | 1132361 | A | 10/1968 |
| GB | 1162448 | A | 8/1969 |
| JP | S42-008205 | Y1 | 4/1967 |
| JP | S47-019501 | B1 | 6/1972 |
| JP | S48-040626 | A | 6/1973 |
| JP | S50-018447 | A | 2/1975 |
| JP | S51-049121 | A | 4/1976 |
| JP | S52-053722 | A | 4/1977 |
| JP | S53-033925 | A | 3/1978 |
| JP | S53-078922 | A | 7/1978 |
| JP | H02-052142 | A | 2/1990 |
| JP | 2000-191360 | A | 7/2000 |
| JP | 2001260119 | A | * 9/2001 | ........... B30B 15/024 |
| JP | 2013-111602 | A | 6/2013 |

OTHER PUBLICATIONS

International Preliminary Report of Patentability dated Feb. 10, 2022 in International Application No. PCT/JP2020/009243.

* cited by examiner

*Primary Examiner* — Anthony J Green
(74) *Attorney, Agent, or Firm* — Faegre Drinker Biddle & Reath LLP

(57) ABSTRACT

The invention relates to a composition for forming a casting mold, the composition containing heat-resistant inorganic particles; a waterglass-based binder; a surfactant; a silicon-containing compound; activated carbon powder and grain; and water; and the silicon-containing compound contains at least one of metal silicon and ferrosilicon.

14 Claims, 5 Drawing Sheets

| | ACTIVATED CARBON NONE | ACTIVATED CARBON 1.2 PARTS BY MASS |
|---|---|---|
| START |  400cc |  400cc |
| AFTER 2 Hr |  EXPANSION TO APPROXIMATELY FOUR TIMES |  UNCHANGED |

COMPOSITION FOR FORMING CASTING MOLD AND CASTING MOLD FORMING METHOD

TECHNICAL FIELD

The present invention relates to a composition for forming a casting mold and a casting mold forming method.

BACKGROUND ART

As a composition for making a core and a casting mold, there is known a composition of which fluidity is improved by using a surfactant (foaming agent) (for example, refer to Patent Literature 1).

CITATION LIST

Patent Literature

Patent Literature 1: Japanese Examined Patent Publication No. S42-008205

SUMMARY OF INVENTION

Technical Problem

However, in the composition, curing time until reaching sufficient casting mold strength for casting often tends to be excessively long, and thus there is a problem of poor productivity.

The invention has been made in consideration of such circumstances, and an object thereof is to provide a composition for forming casting mold which has excellent fluidity and rapid curability. In addition, another object of the invention is to provide a casting mold forming method using the composition for forming a casting mold.

Solution to Problem

An aspect of the invention provides a composition for forming a casting mold containing: heat-resistant inorganic particles; a waterglass-based binder; a surfactant; a silicon-containing compound; activated carbon powder and grain; and water, wherein the silicon-containing compound contains at least one of metal silicon and ferrosilicon. In such composition for forming a casting mold, fluidity of respective components is maintained at the timing of filling a cast and heat generation occurs in a timely manner after the filling, and thus reaction of the respective components progresses. It can be said that the composition for forming a casting mold has excellent productivity.

In one aspect, it is preferable that the content of silicon contained in the silicon-containing compound is 0.5 to 5.0 parts by mass with respect to 100 parts by mass of heat-resistant inorganic particles.

In one aspect, it is preferable that the content of the activated carbon powder and grain is 0.5 to 3.0 parts by mass with respect to 100 parts by mass of heat-resistant inorganic particles.

In one aspect, it is preferable that the heat-resistant inorganic particles include at least one of natural sand and artificial sand.

In one aspect, it is preferable that a molar ratio expressed by $SiO_2/Na_2O$ of the waterglass-based binder is 4.0 or less.

In one aspect, it is preferable that the content of the waterglass-based binder is 0.1 to 10 parts by mass with respect to 100 parts by mass of heat-resistant inorganic particles.

In one aspect, it is preferable that the content of the surfactant is 0.01 to 0.3 parts by mass with respect to 100 parts by mass of heat-resistant inorganic particles.

Another aspect of the invention provides a casting mold forming method including a process of filling a cast with the composition for forming a casting mold.

Advantageous Effects of Invention

According to the aspects of the invention, it is possible to provide a composition for forming a casting mold which has excellent fluidity and rapid curability. In addition, it is possible to provide a casting mold forming method using the composition for forming a casting mold.

DESCRIPTION OF EMBODIMENTS

Figure 1:
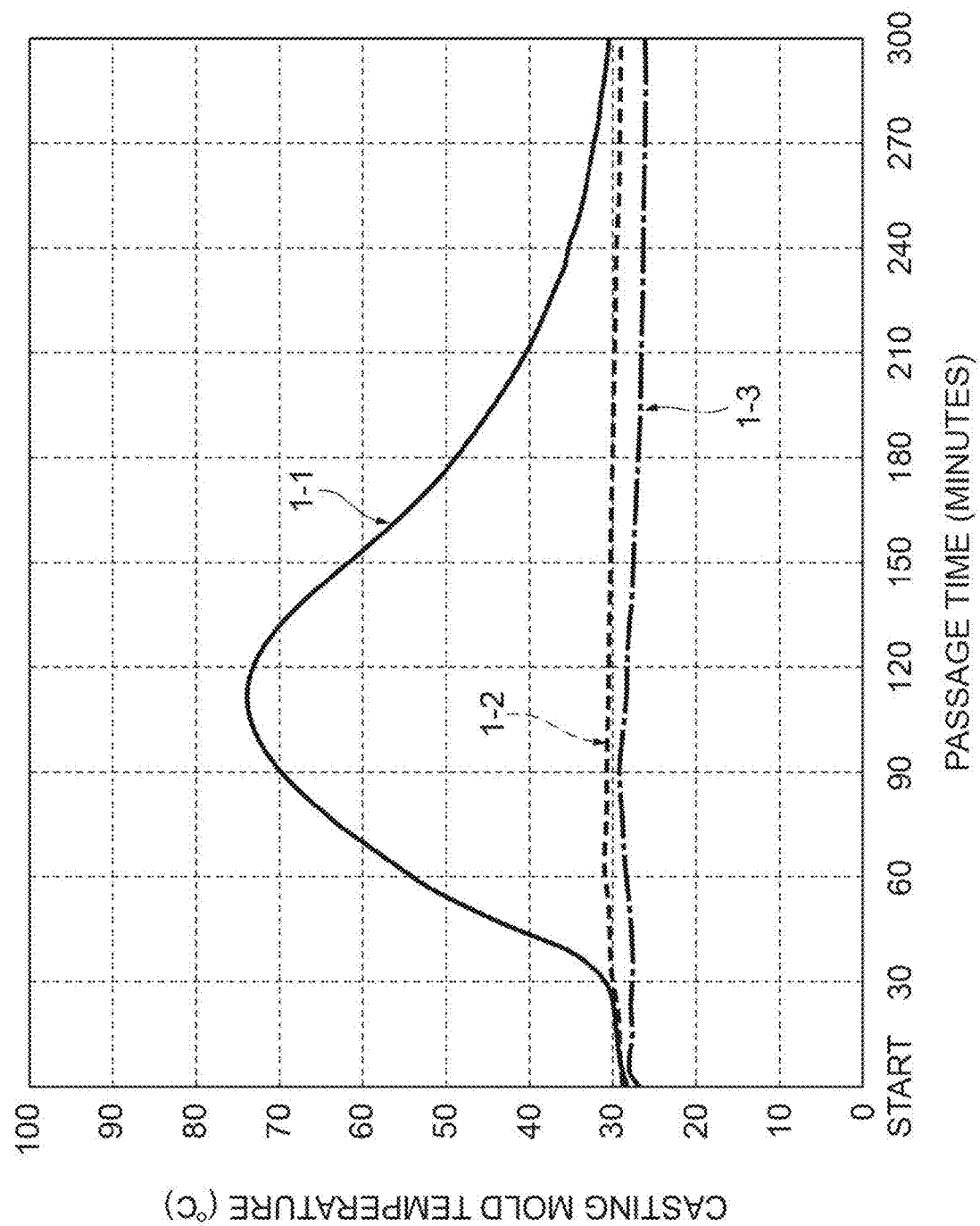
FIG. 1 is a graph showing a result of Experimental Example 1.

Hereinafter, an embodiment of the invention will be described in detail. However, the invention is not limited to the following embodiment.

<Composition for Forming Casting Mold>

A composition for forming a casting mold contains heat-resistant inorganic particles, a waterglass-based binder, a surfactant, a silicon-containing compound, activated carbon powder and grain, and water.

(Heat-Resistant Inorganic Particles)

Examples of the heat-resistant inorganic particles include natural sand containing inorganic oxides such as a silicon oxide and an aluminum oxide as a main component, or artificial sand containing the inorganic oxides as a main component. A particle size of the heat-resistant inorganic particles is preferably 30 to 120 in an AFS grain fineness number, and more preferably 50 to 100. In castings in which greater importance is placed on a casting surface, it is preferable that the heat-resistant inorganic particles have fineness to a certain extent. On the other hand, in order to prevent a gas defect or the like in the castings, typically, it is preferable that the heat-resistant inorganic particles have roughness to a certain extent so as to secure air permeability of a casting mold.

(Waterglass-Based Binder)

Examples of the waterglass-based binder include $Na_2SiO_3$, $Na_4SiO_4$, $Na_2Si_2O_5$, and $Na_2Si_4O_9$. The waterglass-based binder, that is, sodium silicate is classified into No. 1 to No. 5 on the basis of a molar ratio of $SiO_2/Na_2O$ as follows. However, in addition to the sodium silicate of Nos. 1 to 5, sodium metasilicate in which a molar ratio of $SiO_2/Na_2O$ is 1.0 can also be used. The sodium metasilicate is commercially available and is easily available.

No. 1: a molar ratio of $SiO_2/Na_2O$ is 2.0 to 2.3.
No. 2: the molar ratio of $SiO_2/Na_2O$ is 2.4 to 2.5.
No. 3: the molar ratio of $SiO_2/Na_2O$ is 3.1 to 3.3.
No. 4: the molar ratio of $SiO_2/Na_2O$ is 3.3 to 3.5.
No. 5: the molar ratio of $SiO_2/Na_2O$ is 3.6 to 3.8.

No. 1 to No. 3 of the sodium silicate are defined in JIS K1408. By mixing the sodium silicates, a molar ratio thereof can be adjusted.

In this embodiment, the smaller the molar ratio is, the larger the amount of a free alkali hydroxide is, and thus a reaction is promoted and an exothermic peak at the time of forming the casting mold tends to occur earlier. From the viewpoint, the molar ratio is preferably 4.0 or less, more preferably 3.0 or less, and still more preferably 2.5 or less. That is, in the classification of the sodium silicate, the sodium silicate having a small number can be more preferably used. Note that, the lower limit of the molar ratio can be set to 1.0.

The content of the waterglass-based binder is preferably 0.1 to 10 parts by mass with respect to 100 parts by mass of heat-resistant inorganic particles in terms of an effective component, and more preferably 1 to 5 parts by mass. The waterglass-based binder has an influence on casting mold strength. The content of the waterglass-based binder can be appropriately adjusted in correspondence with a particle size and a particle shape of the heat-resistant inorganic particles which are used. In the case of desiring to obtain sufficient (for example, 1 MPa or greater of) casting mold strength, when using fine heat-resistant inorganic particles, a particle surface area increases, and thus it is preferable to increase the content of the waterglass-based binder to a certain extent. In addition, when using rough heat-resistant inorganic particles or heat-resistant inorganic particles having high sphericity, the particle surface area decreases, and thus it is preferable to decrease the content of the waterglass-based binder to a certain extent.

(Surfactant)

Examples of the surfactant include an anionic surfactant, a nonionic surfactant, an amphoteric surfactant, and a mixture thereof.

Examples of the anionic surfactant include surfactants such as carboxylate, sulfonate, sulfuric acid ester salt, and phosphoric acid ester salt. Examples of the nonionic surfactant include surfactants of an ester type, an ether type, and an ester-ether type. Examples of the amphoteric surfactant include an amino acid-based surfactant, a betaine-based surfactant, and an amine oxide-based surfactant.

The content of the surfactant is preferably 0.01 to 0.3 parts by mass with respect to 100 parts by mass of heat-resistant inorganic particles in terms of an effective component, and more preferably 0.02 to 0.2 parts by mass. The content of the surfactant may be adjusted from the viewpoint of fluidity of the composition for forming a casting mold. When the content of the surfactant is insufficient, foaming becomes less, and the fluidity tends to decrease. On the other hand, the content of the surfactant is excessive, the amount of air bubbles trapped becomes excessive, and the fluidity also tends to decrease. From this viewpoint, the content of the surfactant may be adjusted so that the apparent viscosity of the composition for forming a casting mold becomes preferably 0.8 to 10 Pa·sec, and more preferably 1.5 to 7 Pa·sec.

(Silicon-Containing Compound)

The silicon-containing compound contains at least one of metal silicon and ferrosilicon. A particle size of the silicon-containing compound is not particularly limited. However, for example, it is preferable that a ratio of particles having a particle size of 45 μm or less is 50% by mass or greater with respect to a total amount of the silicon compound. According to this, the silicon-containing compound and the alkali hydroxide easily react with each other, and thus heat is efficiently generated.

The content of silicon contained in the silicon-containing compound is preferably 0.5 to 5.0 parts by mass with respect to 100 parts by mass of heat-resistant inorganic particles, and more preferably 1.0 to 3.0 parts by mass. The content of the silicon-containing compound can be adjusted in consideration of the silicon content in the compound. Since the silicon-containing compound and the alkali hydroxide efficiently react with each other and heat is generated, and thus moisture of the casting mold can be reduced. When the content of the silicon-containing compound is excessively small, it is difficult to obtain sufficient heat generation, and when the content is excessively large, the cost tends to be unreasonable.

(Activated Carbon Powder and Grain)

When the composition for forming a casting mold contains the activated carbon powder and grain, sufficient heat generation can be caused to occur even in a composition of which fluidity is improved due to the surfactant. In addition, expansion of the composition that occurs due to an exothermic reaction can be suppressed.

The activated carbon powder and grain can include granular activated carbon and powdered activated carbon. Typically, the activated carbon is largely classified into powdered activated carbon having a particle size less than 150 μm, and granular activated carbon having a particle size greater than or equal to the particle size. However, when the particle size is excessively large, there is a concern that contact efficiency with other contained components decreases, and a sufficient exothermic reaction does not occur. Accordingly, as the activated carbon powder and grain, the powdered activated carbon is preferable, and a preferred particle size thereof is several tens of micrometers.

From the viewpoint of controlling an exothermic reaction between the silicon-containing compound and the alkali hydroxide, the content of the activated carbon powder and grain is preferably 0.5 to 3.0 parts by mass with respect to 100 parts by mass of heat-resistant inorganic particles, and more preferably 0.7 to 1.5 parts by mass.

(Heat Generation Promoting Agent)

The composition for forming a casting mold may further contain a heat generation promoting agent so as to adjust a curing rate of the casting mold. Examples of the heat generation promoting agent include hydroxides of alkali metals and hydroxides of alkali-earth metals, and particularly, sodium hydroxide, potassium hydroxide, and the like can be preferably used.

The content of the heat generation promoting agent is preferably 0 to 1.5 parts by mass with respect to 100 parts by mass of heat-resistant inorganic particles, and more preferably 0 to 0.8 parts by mass. The heat generation promoting agent has an influence on an exothermic peak temperature and time taken to reach the exothermic peak temperature. Under conditions in which casting mold forming time is sufficiently secured, even though the heat generation promoting agent is not added, the exothermic reaction progresses, and a desired casting mold can be obtained. On the other hand, when the heat generation promoting agent is added, time taken to reach the exothermic peak temperature can be shortened, and a higher exothermic peak temperature can be obtained.

(Gelling Agent)

The composition for forming a casting mold may further contain a gelling agent so as to defoam micro air bubbles contained in the composition for forming a casting mold, and so as to suppress expansion of the casting mold due to a hydrogen gas that is generated when an exothermic reaction progresses by gelation of the waterglass-based binder. The gelling agent is not particularly limited as long as the gelling agent generates an acid under presence of alkali, and causes the waterglass to gelate by a neutralization reaction, but a gelling agent represented by glyoxal or propylene carbonate can be selected.

The content of the gelling agent is preferably 0 to 1.5 parts by mass with respect to 100 parts by mass of heat-resistant inorganic particles, and more preferably 0 to 0.8 parts by mass.

(Water)

As the water, tap water, distilled water, deionized water, or the like may be used.

The water has an influence on the fluidity of the composition for forming a casting mold. The content of water may be appropriately determined in consideration of mixing ratios of the heat-resistant inorganic particles, a silicon-based compound, the activated carbon, and the like, the shape, the size, and the like of the heat-resistant inorganic particles, and the kind, the addition amount, or the like of the surfactant. When the content of the water is excessively small, the fluidity of the composition for forming a casting mold tends to decrease. When the content is excessively large, separation of the heat-resistant inorganic particles from the other contained components occurs, and dehydration from the casting mold formed from the composition for forming a casting mold tends to be difficult. From this viewpoint, the content of water may be adjusted so that the apparent viscosity of the composition for forming a casting mold becomes preferably 0.8 to 10 Pa·sec, and more preferably 1.5 to 7 Pa·sec also in consideration of the kind of the surfactant that is used, the content thereof, or the like.

<Casting Mold Forming Method>

The casting mold can be manufactured by a casting mold forming method including a process of filling a cast surrounded by a casting frame with the composition for forming a casting mold. When filling the cast, it is preferable that the composition for forming a casting mold is sufficiently stirred until becomes a whipped shape. Filling of the cast can be performed by pouring the composition in a case where the composition after stirring has high fluidity, and by pressurization or vibration in a case where the composition has viscosity to a certain extent.

The composition for forming a casting mold which has been filled in the cast generates heat in a timely manner, a reaction with respective components progresses, and the composition is cured. From the viewpoint of rapid curability, time at which an exothermic peak occurs is preferably within 200 minutes after filling, more preferably within 180 minutes, and still more preferably within 150 minutes. In addition, a casting mold temperature at the exothermic peak is preferably 50° C. or higher, more preferably 60° C. or higher, and still more preferably 70° C. or higher.

The casting mold after being cured is removed from the cast (demolding). After demolding, various coatings may be performed on the casting mold in a state in which the casting mold temperature is 40° C. or higher, and preferably 55° C. or higher.

EXAMPLES

The contents of the invention will be described in more detail with reference to examples and comparative examples. Note that, the invention is not limited to the following examples.

Experimental Example 1: Exothermic Characteristics According to Addition or Non-Addition of Activated Carbon Kneaded Sand 1-1

As the heat-resistant inorganic particles, 1000 g of flattery sand (sold by Mitsubishi Shoji Construction Materials Corporation, AFS grain fineness number: 60), 40 g of ferrosilicon powder (manufactured by Kanto Metal Corporation, silicon content: 75% by mass), and 9 g of powdered activated carbon (manufactured by FUTAMURA CHEMICAL CO., LTD.) were put into a table mixer manufactured by AICOHSHA MFG CO., LTD., and they were mixed and stirred for 15 seconds. Then, 60 g of waterglass of No. 1 (manufactured by FUJI CHEMICAL CO., LTD: a molar ratio of $SiO_2/Na_2O$ is 2.0 to 2.3), and 40 g of 10% by mass aqueous solution of sodium hydroxide were added to the mixture, and the resultant mixture was stirred for 30 seconds. Then, 16 g of 3% by mass anionic surfactant solution (manufactured by ADEKA Corporation) was further added to the mixture, and the resultant mixture was stirred for 30 seconds to prepare kneaded sand 1-1 (composition for forming a casting mold) having a whipped shape.

Kneaded Sand 1-2

Kneaded sand 1-2 was prepared in a similar manner as in the kneaded sand 1-1 except that the powdered activated carbon was not used.

Kneaded Sand 1-3

Kneaded sand 1-3 was prepared in a similar manner as in the kneaded sand 1-2 except that the amount of the anionic surfactant solution was changed to 10 g.

The obtained kneaded sand was put into a 1000 ml polyethylene beaker having a diameter of 100 mm and was placed in a stationary state, and then a temperature variation with the passage of time in the kneaded sand was measured. Note that, temperature measurement was performed by using a sheath thermocouple connected to a recorder. Results are shown in FIG. 1.

Experimental Example 2: Exothermic Characteristics According to Addition Amount of Activated Carbon Kneaded Sand 2-1

As the heat-resistant inorganic particles, 1000 g of ESPEARL (artificial sand, No. 60 manufactured by YAMAKAWA SANGYO CO., LTD., AFS grain fineness number: 60), 15 g of metal silicon powder (manufactured by Kanto Metal Corporation, content: 98.8% by mass), and 6 g of powdered activated carbon (manufactured by FUTAMURA CHEMICAL CO., LTD.) were put into a table mixer manufactured by AICOHSHA MFG CO., LTD., and they were mixed and stirred for 15 seconds. Then, 30 g of waterglass of No. 1 (manufactured by FUJI CHEMICAL CO., LTD), and 26 g of 15% by mass aqueous solution of sodium hydroxide were added to the mixture, and the resultant mixture was stirred for 30 seconds. Then, 14 g of 8% by mass nonionic surfactant solution (manufactured by Kao Corporation) was further added to the mixture, and the resultant mixture was stirred for 30 seconds to prepare kneaded sand 2-1 having a whipped shape.

Kneaded Sand 2-2

Kneaded sand 2-2 was prepared in a similar manner as in the kneaded sand 2-1 except that the amount of the powdered activated carbon was changed to 9 g.

Figure 2:
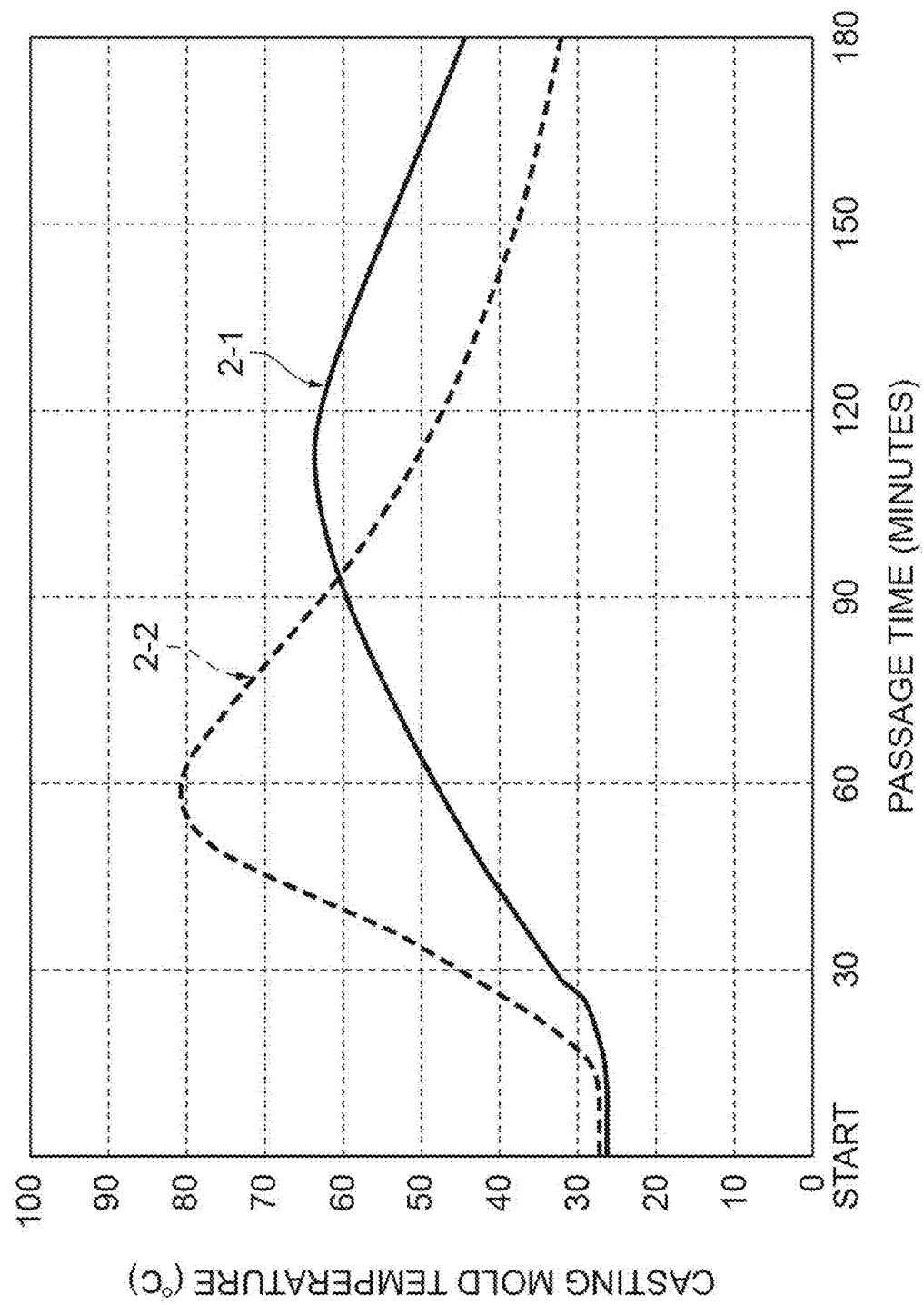
FIG. 2 is a graph showing a result of Experimental Example 2.

The obtained kneaded sand 2-1 and the obtained kneaded sand 2-2 were put into a 1000 ml polyethylene beaker having a diameter of 100 mm and was placed in a stationary state, and then a temperature variation with the passage of time in the kneaded sand was measured in a similar manner as in Experimental Example 1. Results are shown in FIG. 2.

Kneaded Sand 2-3

Kneaded sand 2-3 was prepared in a similar manner as in the kneaded sand 2-1 except that the amount of 15% by mass aqueous solution of sodium hydroxide was changed to 13 g.

Kneaded Sand 2-4

Kneaded sand 2-4 was prepared in a similar manner as in the kneaded sand 2-1 except that the 15% by mass aqueous solution of sodium hydroxide was not used.

Figure 3:
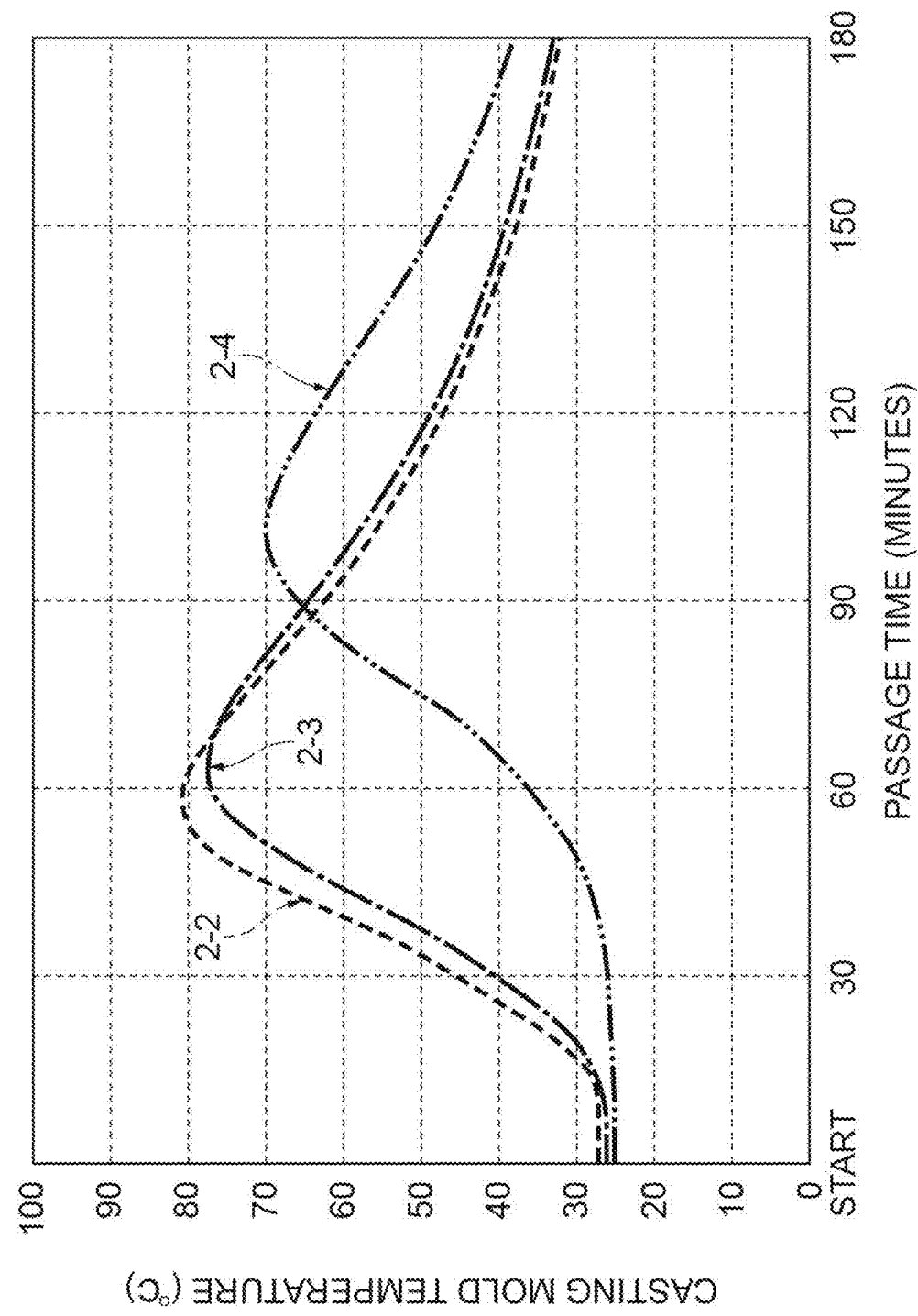
FIG. 3 is a graph showing a result of Experimental Example 2.

The obtained kneaded sand 2-3 and the obtained kneaded sand 2-4 were put into a 1000 ml polyethylene beaker having a diameter of 100 mm and was placed in a stationary state, and then a temperature variation with the passage of time in the kneaded sand was measured in a similar manner as in Experimental Example 1. Results are shown in FIG. 3.

Experimental Example 3: Fluidity Confirmation Test

Kneaded Sand 3-1 and Kneaded Sand 3-2

As the heat-resistant inorganic particles, 1000 g of ESPEARL (artificial sand, No. 60 manufactured by YAMAKAWA SANGYO CO., LTD., AFS grain fineness number: 60), metal silicon powder (manufactured by Kanto Metal Corporation, content: 98.8% by mass), and powdered activated carbon (manufactured by FUTAMURA CHEMICAL CO., LTD.) were put into a table mixer manufactured by AICOHSHA MFG CO., LTD., and they were mixed and stirred for 15 seconds. Then, waterglass of No. 1 (manufactured by FUJI CHEMICAL CO., LTD) and 15% by mass aqueous solution of sodium hydroxide were added to the mixture, and the resultant mixture was stirred for 30 seconds. Then, 8% by mass nonionic surfactant solution (manufactured by Kao Corporation) was further added to the mixture, and the resultant mixture was stirred for 30 seconds to prepare kneaded sand 3-1 and kneaded sand 3-2 having a whipped shape. An addition amount of each component was set as shown in Table 1.

Figure 4:
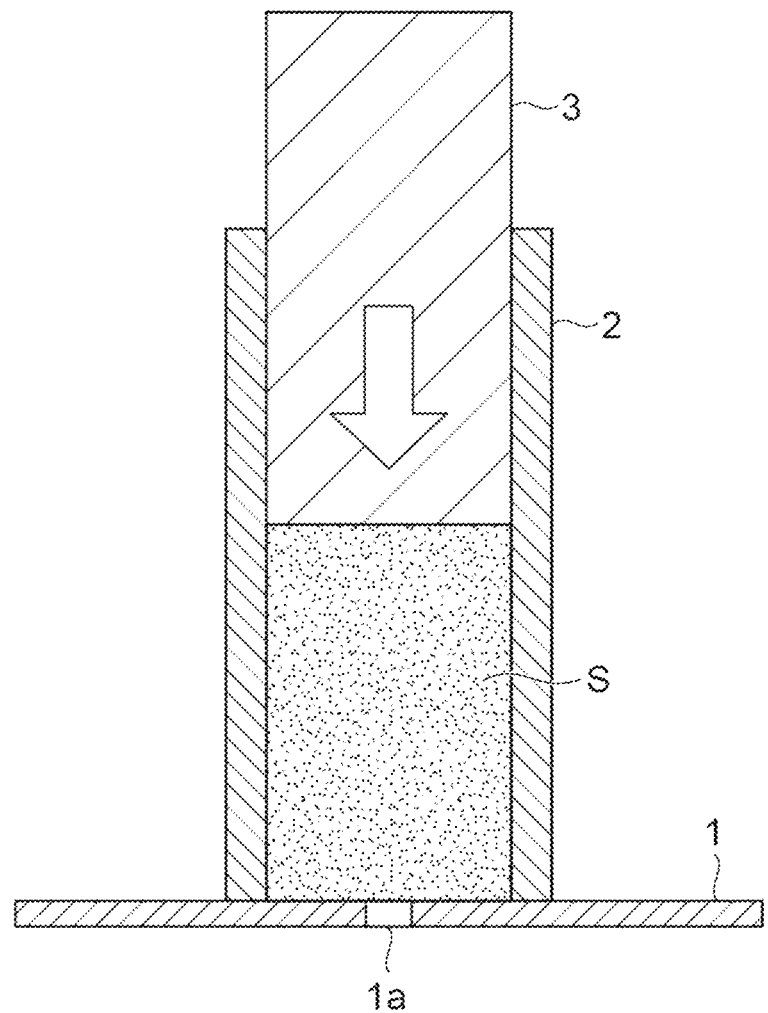
FIG. 4 is a schematic view of an apparent viscosity measuring device used in Experimental Example 3.

Fluidity of each kneaded sand obtained as described above was confirmed by an apparent viscosity measurement device illustrated in FIG. 4. Specifically, a pipe 2 having an inner diameter of Φ50 and H of 150 mm was set on a plate (die) 1 provided with an injection port 1a having Φ6 and t4, and kneaded sand S was put into the pipe 2 up to H of approximately 100 mm. Load was applied to the kneaded sand S with an SUS rod 3 having an outer diameter of Φ40 and H of 100 mm, time for which the kneaded sand corresponding to 50 mm was discharged from the injection port 1a was measured, and apparent viscosity was calculated from the time. Results are shown in Table 1.

TABLE 1

| Kneaded sand | Silicon powder | Activated carbon | Waterglass | Sodium hydroxide | Water | Surfactant | Apparent viscosity (Pa · s) |
|---|---|---|---|---|---|---|---|
| 3-1 | 17 | 12 | 30 | 4 | 38 | 18 | 2.51 |
| 3-2 | 10 | 9 | 30 | 4 | 25 | 18 | 1.66 |

Experimental Example 4: Casting Mold Expansion Confirmation Test According to Addition or Non-Addition of Activated Carbon Kneaded Sand 4-1

As the heat-resistant inorganic particles, 1000 g of ESPEARL (artificial sand, No. 60 manufactured by YAMAKAWA SANGYO CO., LTD., AFS grain fineness number: 60), and metal silicon powder (manufactured by Kanto Metal Corporation, content: 98.8% by mass) were put into a table mixer manufactured by AICOHSHA MFG CO., LTD., and they were mixed and stirred for 15 seconds. Then, waterglass of No. 1 (manufactured by FUJI CHEMICAL CO., LTD), and 15% by mass aqueous solution of sodium hydroxide were added to the mixture, and the resultant mixture was stirred for 30 seconds. Then, 8% by mass nonionic surfactant solution (manufactured by Kao Corporation) was further added to the mixture, and the resultant mixture was stirred for 30 seconds to prepare kneaded sand 4-1 having a whipped shape. An addition amount of each component was set as shown in Table 2.

Kneaded Sand 4-2

Kneaded sand 4-2 was prepared in a similar manner as in the kneaded sand 4-1 except that powdered activated carbon (manufactured by FUTAMURA CHEMICAL CO., LTD.) was further put to the heat-resistant inorganic particles.

Figure 5:
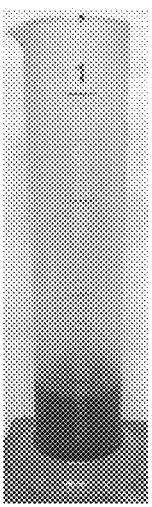
FIG. 5 is a view showing a result of Experimental Example 4.
Figure 5:
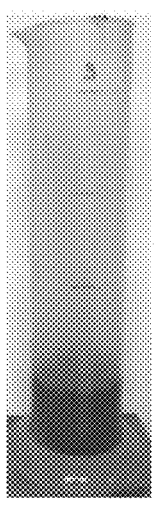
Figure 5:
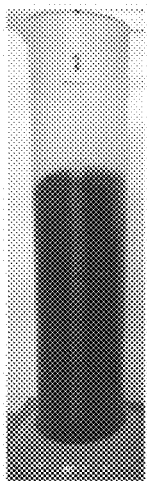
Figure 5:
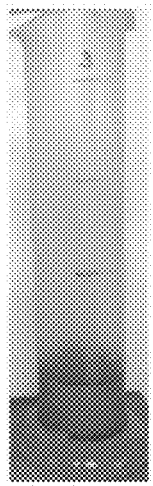

400 mL of each kneaded sand obtained as described above was poured into a 2-liter measuring cylinder and was placed in a stationary manner. An expansion situation of the kneaded sand after two hours was observed. Results are shown in FIG. 5. In the kneaded sand 4-1 in which the activated carbon was not added, the volume was expanded up to approximately four times (1600 mL), and curing was also not recognized. On the other hand, in the kneaded sand 4-2 containing the activated carbon, a large volume change did not occur, and the curing was recognized.

TABLE 2

| Kneaded sand | Amount of each component (g) | | | | | | Volume after two hours (mL) |
|---|---|---|---|---|---|---|---|
| | Silicon powder | Activated carbon | Waterglass | Sodium hydroxide | Water | Surfactant | |
| 4-1 | 17 | 0 | 30 | 4 | 25 | 18 | 1600 |
| 4-2 | 17 | 12 | 30 | 4 | 25 | 18 | 400 |

REFERENCE SIGNS LIST

1: plate (die), 1a: injection port, 2: pipe, 3: SUS rod, S: kneaded sand.

The invention claimed is:

1. A composition for forming a casting mold, comprising:
heat-resistant inorganic particles;
a waterglass-based binder;
a surfactant;
a silicon-containing compound;
activated carbon powder and grain; and
water,
wherein the silicon-containing compound contains at least one of metal silicon and ferrosilicon, and
wherein the content of the activated carbon powder and grain is 0.5 to 3.0 parts by mass with respect to 100 parts by mass of the heat-resistant inorganic particles.

2. The composition for forming a casting mold according to claim 1,
wherein the content of silicon contained in the silicon-containing compound is 0.5 to 5.0 parts by mass with respect to 100 parts by mass of the heat-resistant inorganic particles.

3. The composition for forming a casting mold according to claim 1,
wherein the heat-resistant inorganic particles include at least one of natural sand and artificial sand.

4. The composition for forming a casting mold according to claim 1,
wherein a molar ratio expressed by $SiO_2/Na_2O$ of the waterglass-based binder is 4.0 or less.

5. The composition for forming a casting mold according to claim 1,
wherein the content of the waterglass-based binder is 0.1 to 10 parts by mass with respect to 100 parts by mass of the heat-resistant inorganic particles.

6. The composition for forming a casting mold according to claim 1,
wherein the content of the surfactant is 0.01 to 0.3 parts by mass with respect to 100 parts by mass of the heat-resistant inorganic particles.

7. The composition for forming a casting mold according to claim 2,
wherein the heat-resistant inorganic particles include at least one of natural sand and artificial sand.

8. The composition for forming a casting mold according to claim 2,
wherein a molar ratio expressed by $SiO_2/Na_2O$ of the waterglass-based binder is 4.0 or less.

9. The composition for forming a casting mold according to claim 3,
wherein a molar ratio expressed by $SiO_2/Na_2O$ of the waterglass-based binder is 4.0 or less.

10. The composition for forming a casting mold according to claim 2,
wherein the content of the waterglass-based binder is 0.1 to 10 parts by mass with respect to 100 parts by mass of the heat-resistant inorganic particles.

11. The composition for forming a casting mold according to claim 3,
wherein the content of the waterglass-based binder is 0.1 to 10 parts by mass with respect to 100 parts by mass of the heat-resistant inorganic particles.

12. The composition for forming a casting mold according to claim 4,
wherein the content of the waterglass-based binder is 0.1 to 10 parts by mass with respect to 100 parts by mass of the heat-resistant inorganic particles.

13. The composition for forming a casting mold according to claim 2,
wherein the content of the surfactant is 0.01 to 0.3 parts by mass with respect to 100 parts by mass of the heat-resistant inorganic particles.

14. A casting mold forming method comprising:
a process of filling a cast with the composition for forming a casting mold according to claim 1.

\* \* \* \* \*